United States Patent
Wolfram (10) Patent No.: US 10,095,691 B2
(45) Date of Patent: Oct. 9, 2018

(54) METHOD AND APPARATUS FOR CONVERTING NATURAL LANGUAGE TO MACHINE ACTIONS

(71) Applicant: Wolfram Research, Inc., Champaign, IL (US)

(72) Inventor: Stephen Wolfram, Concord, MA (US)

(73) Assignee: Wolfram Research, Inc., Champaign, IL (US)

( * ) Notice: Subject to any disclaimer, the term of this patent is extended or adjusted under 35 U.S.C. 154(b) by 126 days.

(21) Appl. No.: 15/077,141

(22) Filed: Mar. 22, 2016

(65) Prior Publication Data

US 2017/0277681 A1    Sep. 28, 2017

(51) Int. Cl.
| | |
|---|---|
| G06F 17/27 | (2006.01) |
| G06F 17/28 | (2006.01) |
| G10L 15/00 | (2013.01) |
| G06F 17/24 | (2006.01) |

(52) U.S. Cl.
CPC ............ G06F 17/28 (2013.01); G06F 17/248 (2013.01)

(58) Field of Classification Search
CPC .. G06Q 10/10; G06Q 10/107; G06F 17/2785; G06F 17/2881; G06F 3/04883
USPC ............ 704/1, 9, 2, 270, 246, 275, 235, 257
See application file for complete search history.

(56) References Cited

U.S. PATENT DOCUMENTS

| | | | |
|---|---|---|---|
| 6,529,865 B1 * | 3/2003 | Duan | ........................ G06F 8/41 704/9 |
| 6,604,075 B1 | 8/2003 | Brown et al. | |
| 8,086,604 B2 | 12/2011 | Arrouye et al. | |
| 8,275,617 B1 | 9/2012 | Morgan et al. | |
| 8,340,970 B2 | 12/2012 | Grant et al. | |
| 8,589,869 B2 | 11/2013 | Wolfram | |
| 9,069,814 B2 | 6/2015 | Wolfram et al. | |
| 9,794,613 B2 * | 10/2017 | Jang | ........................ G10L 15/22 |
| 2006/0276230 A1 | 12/2006 | McConnell | |
| 2008/0153465 A1 | 6/2008 | Evermann et al. | |
| 2008/0154611 A1 | 6/2008 | Evermann et al. | |
| 2008/0154612 A1 | 6/2008 | Evermann et al. | |
| 2008/0154870 A1 | 6/2008 | Evermann et al. | |
| 2009/0326940 A1 | 12/2009 | Markefka et al. | |
| 2013/0018659 A1 | 1/2013 | Chi et al. | |
| 2013/0124207 A1 | 5/2013 | Sarin et al. | |
| 2013/0125094 A1 | 5/2013 | Wolfram et al. | |
| 2013/0204610 A1 | 8/2013 | Wu | |
| 2013/0297293 A1 | 11/2013 | Di Cristo et al. | |
| 2015/0154012 A1 | 6/2015 | Wolfram | |

* cited by examiner

*Primary Examiner* — Charlotte M Baker
(74) *Attorney, Agent, or Firm* — Drinker Biddle & Reath LLP

(57) ABSTRACT

First specification data defining a grammar corresponding to natural language, and second specification data defining a mapping between the grammar and one or more outputs to be generated, are received. An electronic object is generated using the first specification data and the second specification data, the electronic object being configured to, when executed by one or more processors, cause the one or more processors to map received natural language input to the one or more outputs. The one or more outputs may be used to control an electronically controllable machine.

30 Claims, 5 Drawing Sheets

```
                        230        204
     208                  ↘        ↙
       ↘                                    216
                                           ↙
  In[1]:= controller = CloudDeploy[
         → GrammarRules[{
   212          FixedOrder["turn", state: GrammarToken["OnOff"], OptionalElement["the"],
                    appliance: GrammarToken["Appliance"]] :→ appliance → state
              },
              {
                 "OnOff" → GrammarToken["On"],
                 "OnOff" → GrammarToken["Off"],
                 "On" → "on" :→ "On",
                 "Off" → "off" :→ "Off",
                 "Appliance" → GrammarToken["Stove"],
   220           "Appliance" → GrammarToken["Refrigerator"],
                 "Appliance" → GrammarToken["Furnace"],
                 "Appliance" → GrammarToken["AirConditioning"],
                 "Appliance" → GrammarToken["Oven"],
                 "Stove" → FixedOrder["stove", OptionalElement["top"]] :→ "Stove",
                 "Refrigerator" → "fridge" | "refrigerator" :→ "Refrigerator",
                 "Furnace" → "heat" | "furnace" | "boiler" :→ "Furnace",
                 "AirConditioning" → FixedOrder["air", OptionalElement["conditioning"]] |
                      "ac" | "a/c" :→ "AirConditioning",
                 "Oven" → "oven" :→ "Oven"
              }]
         ]

244↘                              248↘
  Out[1]:= CloudObject[https://www.wolframcloud.com/objects/23aa0b1c-ddbf-4118-9446-42ee92ed8edc]
            260↘
  In[2]:= GrammarApply[controller, "turn off the stove"]
            274↘         ↖264      ↖268
  Out[2]:= Stove -> Off
```

```
                  608                    630         604
                    ↘                     ↓          ↙
In[1]:= grammar = CloudDeploy[
    612 → GrammarRules[{
                            ← 616
            GrammarToken["Cities"]
        }, {
            "Cities" → c: GrammarToken["City"] :→ {c},
            "Cities" → FixedOrder[
   620 →        cs: GrammarToken["Cities"],
                OptionalElement["," | "|" | "and" | ";"],
                c: GrammarToken["City"]
            ] :→ Append[cs, c]
        }]
    ]

644↘                              648↘
Out[1]:= CloudObject[https://www.wolframcloud.com/objects/73be52ed-06cf-4f91-95b5-be4e1f89b729]

660↘
In[2]:= GrammarApply[grammar, "Chicago, New York, LA"]
         674↘       ↖664      ↖668

Out[2]:= { Chicago , New York City , Los Angeles }
```

```
In[1]:=   delseq = CloudDeploy[
              GrammarRules[{
                  cs:DelimitedSequence[GrammarToken["City"], "," | "|" | "and" | ";"] :→ cs
              }]
          ]

Out[1]=   CloudObject[https://www.wolframcloud.com/objects/a2763ef7-680b-4e03-b8b4-879e2963c8eb]

In[2]:=   GrammarApply[delseq, "Chicago, New York, LA"]

Out[2]=   { Chicago , New York City , Los Angeles }
```

↖ 700

METHOD AND APPARATUS FOR CONVERTING NATURAL LANGUAGE TO MACHINE ACTIONS

FIELD OF THE DISCLOSURE

The present disclosure generally relates to natural language processing, and more particularly, converting natural language commands to machine actions.

BACKGROUND

Some systems and devices are controllable via voice commands. For example, an automobile may permit a driver to turn on a radio, change a channel on the radio, etc., using voice commands. As another example, a mobile telephone may permit a user to initiate a call to a particular contact using voice commands. Such voice control systems, however, are typically inflexible and limit the degree to which a user can reconfigure to system to respond to different voice commands. Additionally, such voice control systems are typically narrowly tailored to a particular device and/or set of voice prompts.

SUMMARY OF THE DISCLOSURE

In an embodiment, a method for mapping natural language input to processor-generated outputs includes: receiving, at one or more computers, first specification data defining a grammar corresponding to natural language; receiving, at one or more computers, second specification data defining a mapping between the grammar and one or more outputs to be generated; and generating, at one or more computers, an electronic object using the first specification data and the second specification data, the electronic object configured to, when executed by one or more processors, cause the one or more processors to map received natural language input to the one or more outputs.

In another embodiment, a system comprises one or more processors, and one or more memory devices coupled to the one or more processors. The one or more memory devices store machine readable instructions that, when executed by the one or more processors, cause the one or more processors to: receive first specification data defining a grammar corresponding to natural language associated with one or more outputs to be generated, receive second specification data defining a mapping between the grammar and the one or more outputs to be generated, and generate an electronic object using the first specification data and the second specification data, the electronic object configured to, when executed by the one or more processors or one or more other processors, cause the one or more processors, or the one or more other processors, to map received natural language input to the one or more outputs.

In yet another embodiment, a method includes: receiving, at one or more processors, natural language (NL) input; and using, at the one or more processors, i) the NL input and ii) an electronic object to generate one or more outputs, wherein the electronic object defines a grammar corresponding to NL associated with one or more outputs, defines a mapping between the grammar and the one or more outputs, and is configured to, when executed by the one or more processors, cause the one or more processors to map received NL input to the one or more outputs.

In still another embodiment, a system comprises one or more processors, and one or more memory devices coupled to the one or more processors. The one or more memory devices store machine readable instructions that, when executed by the one or more processors, cause the one or more processors to: receive natural language (NL) input, and use i) the NL input and ii) an electronic object to generate one or more outputs, wherein the electronic object defines a grammar corresponding to NL associated with a plurality of actions to be taken by the machine, defines a mapping between the grammar and the one or more outputs, and is configured to, when executed by the one or more processors, cause the one or more processors to map received NL input to the one or more outputs.

DETAILED DESCRIPTION

Figure 1:
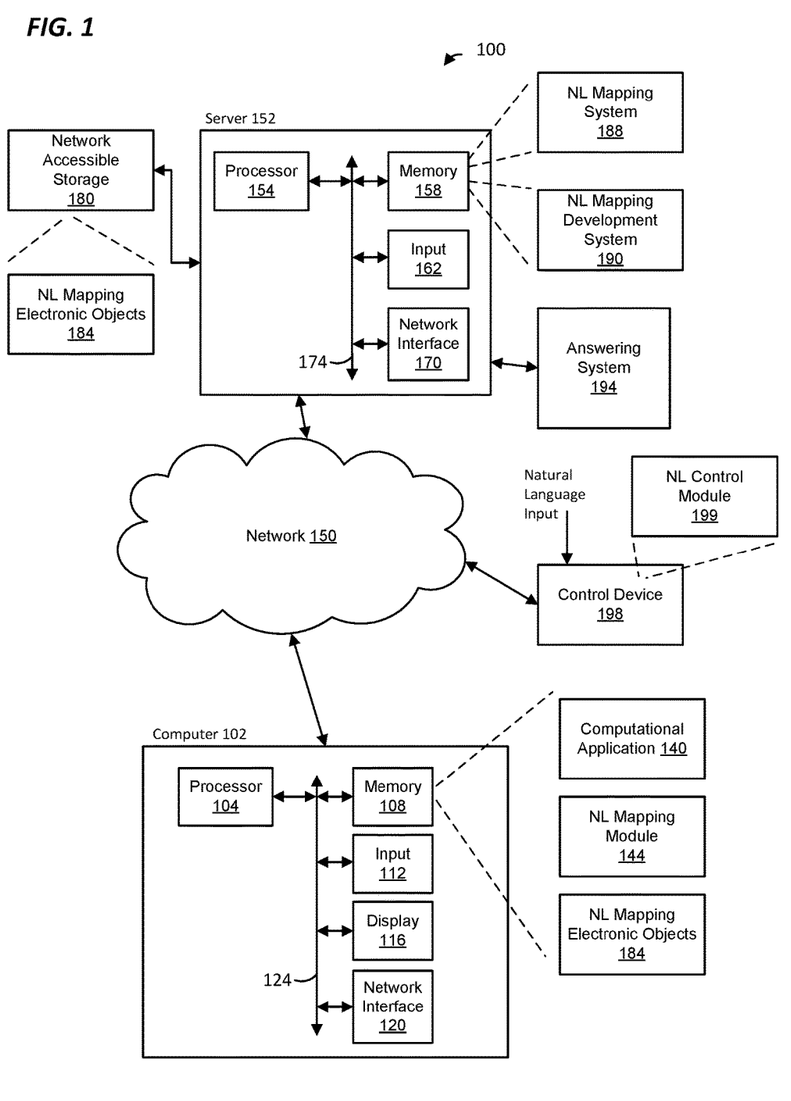
FIG. 1 is a diagram of an example system for using and/or facilitating the use of natural language to control machines, according to an embodiment.

FIG. 1 is a diagram of an example system 100 for creating computer executable electronic objects that map natural language (NL) statements to machine actions, and/or causing machine actions to be taken in response to NL statements, according to an embodiment. For example, in some embodiments, a designer uses the system 100 to create computer executable electronic objects that specify how voice and/or text commands from users will cause a machine (e.g., a computer, a consumer appliance, an automobile, a consumer electronic device, an industrial machine, etc.) to take various desired actions. In some embodiments, a processor (e.g., of the machine or communicatively coupled to the machine) then uses such computer executable electronic objects to determine how to map voice and/or text commands from users to desired actions, and causes the machine to take the desired actions (e.g., by sending appropriate electronic control signals to the machined).

In an embodiment, the system 100 includes one or more computers, such as a computer 102. The computer 102 includes one or more processors 104 and one or more memory devices 108. The computer 102 also includes, or is coupled to, one or more input devices 112. Additionally, the computer 102 includes, or is coupled to, one or more display devices 116. In some embodiments, the computer 102 may include one or more network interface devices 120. The one or more processors 104, the one or more memory devices 108, the one or more input devices 112 (sometime referred to herein as "the input device 112" for brevity), the one or more display devices 116 (sometime referred to herein as "the display device 116" for brevity), the one or more network interface devices 120 (sometime referred to herein as "the network interface device 120" for brevity), etc., may be communicatively coupled via one or more busses 124 (sometime referred to herein as "the bus 124" for brevity). In other embodiments, the computer 102 may have other suitable structures and/or components.

The one or more processors 104 (sometime referred to herein as "the processor 104" for brevity) may comprise one or more general purpose processors (e.g., a central processing unit), one or more special purpose processors (e.g., a co-processor, a graphics processor, a digital signal processing (DSP) processor (e.g., for speech recognition processing), etc.). At least one of the one or more processors 104 executes machine readable instructions stored in the memory 108. The one or more memory devices 108 (sometime referred to herein as "the memory 108" for brevity) include one or more of random access memory (RAM), read only memory (ROM), a FLASH memory, a magnetic disk drive, an optical disk drive, etc.

The one or more input devices 112 include one or more suitable input devices such as a keyboard, a key pad, a mouse, a trackball, one or more buttons, a touch screen that overlays a display device, a microphone, etc. In some embodiments, the one or more input devices 112 may include an analog-to-digital converter (ADC) for converting an analog signal produced by a device such as a microphone to a digital signal.

The one or more network interface devices 120 comprise one or more suitable network interface devices (NICs) such as a wired network NIC, a wireless network NIC, etc.

In some embodiments, the memory 108 may store a computational application 140 such as the MATHEMATICA® computational application from Wolfram Research, Inc., a spreadsheet application, etc., where the computational application 140 is configured to facilitate natural language (NL) control of machines, as discussed in more detail below. For example, in an embodiment, the computational application 140 may include an NL mapping module 144 that enables creation and/or modification of NL mapping electronic objects that map NL statements to machine actions, according to various embodiments. In some embodiments, the NL mapping electronic objects are used to provide NL control of machines, as will be described in more detail below.

In some embodiments, the computational application 140 is configured to provide an electronic user interface such as a workspace (e.g., a notebook, a spreadsheet, a document, etc.) in which a user can enter software code and/or functions to be evaluated, cause the functions to be evaluated, and/or view results of the evaluations. In some embodiments, a user can enter software code and/or functions in the workspace, where the software code and/or functions cause NL mapping electronic objects to be created and/or modified.

In some embodiments, however, the computational application 140 is omitted and the NL mapping module 144 is a standalone application and/or module. In some embodiments, the NL mapping module 144 is incorporated into another suitable application different than the computational application 140, such as an integrated development environment (IDE) system.

In some embodiments, the NL mapping module 144 is a front end to a network accessible NL mapping system. In an embodiment, NL mapping module 144 is, or is incorporated in, a web browser, and a user can cause the network accessible NL mapping system to create and/or to modify NL mapping electronic objects via the web browser.

In some embodiments, the memory 108 may store speech recognition software configured to process electrical signals produced by a microphone. In some embodiments, the memory 108 may store software configured to interact with a server that provides speech recognition functionality. For example, the software may be configured to send audio input signals (e.g., corresponding to audio received via a microphone of or coupled to the computer 102) to the server, and to receive from the server text data corresponding to speech in the audio input signals. In some embodiments, the computer 102 may include speech recognition hardware configured to process electrical signals produced by a microphone and to generate text data corresponding to speech detected in the electrical signals produced by the microphone.

In various embodiments, the computer 102 comprises a desktop computer, a workstation, a laptop computer, a tablet computer, a smart phone, a personal digital assistant, a gaming system, a cable-, satellite-, Internet-, television set-top box, a server, etc. If other computers (not shown) similar to the computer 102 are included, the other computers may be of various types.

In some embodiments, the computer 102 (and, optionally, one or more other computers) is coupled to a network 150. The network 150 may comprise one or more of a local area network (LAN), a wide area network (WAN), a metropolitan area network (MAN), a mobile communications network, an intranet, an extranet, the Internet, a wired network, a wireless network, etc.

In some embodiments, the system 100 may include one or more servers such as the server 152. FIG. 1 illustrates a single server 152 for brevity, but the system 100 includes multiple other similarly configured servers in some embodiments. In some embodiments, multiple servers (including the server 152) are networked together to provide online access to data storage via the network 150. One server 152 will be discussed in detail with respect to FIG. 1, and other servers (if included) have the same or a similar suitable structure, in some embodiments.

The server 152 includes one or more processors 154 and one or more memory devices 158. The server 152 also may include, or be coupled to, one or more input devices 162. The server 152 includes one or more network interface devices 170. The one or more processors 154, the one or more memory devices 158, the one or more input devices 162 (sometime referred to herein as "the input device 162" for brevity), the one or more network interface devices 170 (sometime referred to herein as "the network interface device 170" for brevity), etc., may be communicatively coupled via one or more busses 174 (sometime referred to herein as "the bus 174" for brevity). In other embodiments, the server 152 may have other suitable structures and/or components.

The one or more processors 154 (sometime referred to herein as "the processor 154" for brevity) may comprise one or more general purpose processors (e.g., a central processing unit), one or more special purpose processors (e.g., a co-processor, a graphics processor, etc.). At least one of the one or more processors 154 executes machine readable instructions stored in the memory 158. The one or more memory devices 158 (sometime referred to herein as "the memory 158" for brevity) include one or more of random access memory (RAM), read only memory (ROM), a FLASH memory, a magnetic disk drive, an optical disk drive, etc.

The one more input devices 162 include one or more suitable input devices such as a keyboard, a key pad, a mouse, a trackball, one or more buttons, a touch screen that overlays a display device, etc. The one or more network interface devices 170 comprise one or more suitable NICs such as a wired network NIC, a wireless network NIC, etc. The server 152 is communicatively coupled to the computer 102 and other computers (not shown) via the communication network 150. The server 152 may be communicatively coupled to other servers (not shown) via another network (not shown) and/or the network 150, in various embodiments.

Additionally, in some embodiments, the server 152 may be communicatively coupled to a storage database system 180, which may comprise one or more suitable databases. The storage database system 180 (sometimes referred to herein as "network accessible storage 180") stores objects (e.g., NL mapping electronic objects) 184 that are accessible, via the server 152 or another server, to computers via the network 150.

In an embodiment, the memory 158 may store an NL mapping system 188. In various embodiments, the NL mapping system 188 is configured to interface with the NL mapping module 144 to create NL mapping electronic objects 184 in the storage database 180, to modify NL mapping electronic objects 184, and/or to make NL mapping electronic objects 184 in the storage database 180 accessible to computers via the network 150. In some embodiments, the NL mapping system 188 includes an NL mapping development system 190 that is configured to interface with the NL mapping module 144 to create and/or modify NL mapping electronic objects in the storage database 180, and/or to make NL mapping electronic objects 184 in the storage database 180 accessible to computers via the network 150. In some embodiments, the NL mapping development system 190 is a standalone system separate from the NL mapping system 188. In some embodiments, the NL mapping development system 190 is a component of a system different than the NL mapping system 188. In some embodiments, the NL mapping system 188 and/or NL mapping development system 190 may be omitted. For example, NL development and/or NL mapping may be performed by the computer 102, according to some embodiments. In some embodiments in which the computer 102 is configured to generate NL mapping electronic objects 184, the NL mapping electronic objects 184 may be stored in the memory 108 of the computer 102.

In some embodiments, the computational application 140 is implemented as a kernel (not shown) running on the server 152 and a front end running on the computer 102. In some embodiments, a cloud-based development system (not shown) runs on the server 152, and the kernel and the NL mapping development system 190 are components of the cloud computing system. In some embodiments, the computational application 140 is included in the cloud-based development system and the computer 102 runs a thin client such as a web browser. In some embodiments, aspects of the computational application 140 running on the server 152 (e.g., the kernel) are separate from the cloud-based development system. In some embodiments, the cloud-based development system is configured as described in U.S. patent application Ser. No. 14/549,541, filed Nov. 20, 2014, which is hereby incorporated by reference herein.

In some embodiments, the server 152 may be communicatively coupled to an answering system and/or natural language processing system 194 (hereinafter "answering system 194") such as described in U.S. Pat. No. 8,589,869 and/or U.S. patent application Ser. No. 13/678,168, filed Nov. 15, 2012, which are hereby incorporated by reference herein in their entireties. In some embodiments, the NL mapping development system 190 and/or the NL mapping system 188 may interface with the answering system 194 and utilize natural language processing capabilities of the answering system 194 to process user input, for example. In some embodiments, the server 152 may be communicatively coupled to the answering system 194 via the network 150 or another suitable communication network separate from the network 150.

In some embodiments, the server 152 utilizes virtualization techniques.

In some embodiments, the system 100 includes a control device 198 communicatively coupled to the network 150, where the control device 198 is configured to electronically control a machine. For instance, in various illustrative embodiments, the control device 198 is, or is included in, a home automation control device (e.g., a thermostat for controlling a heating and/or air conditioning system, a lighting system control device for controlling lights, a security system control device for controlling a home security system, a consumer appliance control device for controlling an appliance such as a television, a dishwasher, a refrigerator, an oven, etc., etc.), a vehicle control device, an industrial control device, a desktop computer, a laptop computer, a tablet computer, a smart phone, etc.

In some embodiments, the control device 198 includes, or is communicatively coupled to, one or more sensors for measuring real world physical parameters such as temperature, pressure, sound, motion, light, speed, acceleration, geographic position, physical orientation, etc. In various embodiments, the control device 198 may be a standalone device, or may be included in another device or system such as the machine that the control device 198 controls.

The control device 198 includes one or more processors and one or more memories coupled to one or more busses (not shown), and has a structure generally similar to the computer 102. In some embodiments, the control device 198 may omit one or more components of the computer 102, such as a display and/or an input device. In other embodiments, the control device 198 additionally or alternatively may include other components not included in the computer 102. In embodiments in which the control device 198 includes a sensor, the sensor may be communicatively coupled to the one or more busses.

In some embodiments, a memory of the control device 198 may store the computational application 140. In some embodiments, the memory of the control device 198 may store a reduced-size version of the computational application 140, e.g., with less functionality than the full-size computational application 140. In some embodiments, the memory of the control device 198 may store an NL control module 199 that is configured to use one or more NL mapping electronic objects 184 to map NL statements to machine actions, and optionally to generate electronic control signals for causing machine actions in response to NL statements. In some embodiments, the memory of the control device 198 may store one or more electronic objects 184. For example, in an embodiment, a manufacturer of the control device 198 may store one or more electronic objects 184 in the memory of the control device 198. As another example, in an embodiment, a user may cause one or more electronic objects 184 to be downloaded from the computer 102, the server 120, another server not shown in FIG. 1, etc., and stored in the memory of the control device 198.

In some embodiments, the NL control module 199 is a component of the computational application 140. In other embodiments, however, the computational application 140 is omitted from the memory of the control device 198, while the memory of the control device 198 stores the NL control module 199 as a standalone application and/or module. In some embodiments, the NL control module 199 is incorporated into another suitable application different than the computational application 140.

In various embodiments, a programmer can utilize the NL mapping module 144 to cause the NL mapping development system 190 to create NL mapping electronic objects 184 and/or to cause the NL mapping development system 190 to modify NL mapping electronic objects 184. For example, in some embodiments, the computational application 140 implements a notebook, a spreadsheet, program, etc., that creates, in cooperation with the NL mapping development system 190, NL mapping electronic objects 184. As another example, in some embodiments, the computational application 140 implements a document, a notebook, a spreadsheet, a program, etc., that modifies, in cooperation with the NL mapping development system 190, NL mapping electronic objects 184.

In some embodiments, the NL control module 199 is implemented on the server 152 and/or the computer 120. In some embodiments in which the NL control module 199 is implemented on the server 152 and/or the computer 120, the NL control module 199 generates one or more control signals, and the server 152 or computer 120 sends the one or more control signals to the machine being controlled. In some embodiments, the NL control module 199 is implemented on the computer 120, and the NL control module 199 controls the computer 120 to take various actions.

In some embodiments, the NL control module 199 is implemented on the control device 198 and the memory of the control device stores NL mapping electronic objects 184, and the NL control module 199 controls the control device 198 to take various actions, such as by generating one or more control signals to control one or more actuators, by generating audio signals to cause a speaker to generate sounds, etc.

Creating and Using NL Mapping Electronic Objects

In some embodiments, the computational application 140 provides one or more built-in functions for creating NL mapping electronic objects 184. For example, in an illustrative embodiment, the computational application 140 may provide a built-in function with a descriptive keyword such as "GrammarRules", where the built-in function is for creating NL mapping electronic objects 184. Thus, in some embodiments, a user can utilize the computational application 140 and the GrammarRules function to create NL mapping electronic objects 184. For example, in an embodiment, in response to a user entering the built-in function GrammarRules into a workspace such as a notebook and causing the computational application 140 to evaluate the built-in function (e.g., by pressing "Enter" or taking some other suitable action), the computational application 140 (e.g., the NL mapping module 144) creates an NL mapping electronic object 184.

In another embodiment, in response to a user entering the built-in function GrammarRules into a workspace such as a notebook and causing the computational application 140 to evaluate the built-in function (e.g., by pressing "Enter" or taking some other suitable action), the computational application 140 (e.g., the NL mapping module 144) interacts with the NL mapping development system 190, causing the NL mapping development system 190 to create an NL mapping electronic object 184. For example, the computational application 140 may evaluate the GrammarRules function entered within the workspace, and, responsive to the evaluation, use an application programming interface (API) to cause the NL mapping development system 190 to create an NL mapping electronic object 184.

As discussed in more detail below, the GrammarRules function provides arguments and/or parameters for a user to specify i) first specification data regarding a grammar corresponding to NL associated with one or more actions to be taken by a machine (sometimes referred to herein as "grammar specification data"), and ii) second specification data defining a mapping between the grammar and the one or more actions (sometimes referred to herein as "mapping specification data").

Responsive to receiving i) information indicating that the user seeks to create an NL mapping electronic object 184, ii) grammar specification data, and iii) mapping specification data (e.g., via one or more of programming input, an API, etc.), the NL mapping module 144 and/or the NL mapping development system 190 creates an NL mapping electronic object 184 using the grammar specification data, and the mapping specification data. In some embodiments, the grammar specification data corresponds to a definition of grammar rules corresponding to a context-free grammar. In some embodiments, the grammar specification data corresponds to specification of grammar rules that are recursive.

In some embodiments, the GrammarRules function includes one or more arguments and/or parameters that a user can utilize to control characteristics of the NL mapping electronic object 184. For example, a first argument or arguments may be utilized to provide grammar specification data, and a second argument or arguments may be utilized to provide mapping specification data, in an embodiment.

In an illustrative embodiment, the GrammarRules function has a format as follows:
GrammarRules[rules]; and/or
GrammarRules[rules, defs], where rules and defs are arguments.

The argument(s) rules may include grammar specification data and/or mapping specification data, in some embodiments. The argument(s) defs may include further grammar specification data and/or mapping specification data, in some embodiments.

In an embodiment, the grammar specification data may indicate (e.g., specify) a template with which NL input is to be processed. The template may be a pattern to which NL input is to be compared, for example. The pattern of NL input may comprise specific words and/or grammar tokens, and may specify a spatial relationship of the specific words and/or the grammar tokens, in some embodiments.

In an embodiments, the mapping specification data may indicate (e.g., specify) a mapping of NL input to output(s) and/or result(s) to be generated in response to the NL input. In some embodiments, the mapping specification data may be associated with a template (e.g., specified with grammar specification data) such that certain output(s) is/are generated in response to i) a processor determining that an NL input matches the template, and ii) one or more grammar tokens corresponding to the template having values specified by the mapping specification data.

In an illustrative embodiment, the rules and defs may be specified by the one or more of the following elements:

"string" where string is a literal string;

StringExpression[ . . . ] specifies an arbitrary string pattern to search for in an NL statement;

RegularExpression[ . . . ] specifies a string pattern to search for in an NL statement;

form1|form2| . . . specifies alternative forms of an element;

OptionalElement[form, def] specifies optional elements in a string pattern, and optionally a default value def for a missing element;

FixedOrder[form1, form2, . . . ] specifies a sequence of elements in a fixed order;

AnyOrder[form1, form2, . . . ] specifies a sequence of elements that can occur in any order;

form . . . specifies an element repeated any number of times;

DelimitedSequence[form, . . . ] specifies a sequence of elements with delimiters;

GrammarToken[form] a grammar rules pattern object that represents any input of the specified form; the form could be built-in or defined;

CaseSensitive[form] specifies a form that must match case sensitively;

x:form specifies a form name to be used in a specification of a grammar and/or a mapping between the grammar and one or more machine actions. In some embodiments, at least some of the elements discussed above can be utilized to specify a template with which NL input is to be processed.

In some embodiments, the computational application 140 provides one or more built-in functions for using NL mapping electronic objects 184 to map NL statements to machine actions. For example, in an illustrative embodiment, the computational application 140 may provide a built-in function with a descriptive keyword such as "GrammarApply", where the built-in function is for processing NL inputs using NL mapping electronic objects 184. Thus, in some embodiments, a user can utilize the computational application 140 and the GrammarApply function to process an NL input for mapping an NL input to a machine action. For example, in an embodiment, in response to a user entering the built-in function GrammarApply into a workspace such as a notebook and causing the computational application 140 to evaluate the built-in function (e.g., by pressing "Enter" or taking some other suitable action), the computational application 140 (e.g., the NL mapping module 144) processes an NL input using an NL mapping electronic object 184 to generate an output(s) or result(s), which can be used to control a machine.

In another embodiment, in response to a user entering the built-in function GrammarApply into a workspace such as a notebook and causing the computational application 140 to evaluate the built-in function (e.g., by pressing "Enter" or taking some other suitable action), the computational application 140 (e.g., the NL mapping module 144) interacts with the NL mapping system 188, causing the NL mapping system 188 to process an NL input using an NL mapping electronic object 184. For example, the computational application 140 may evaluate the GrammarApply function entered within the workspace, and, responsive to the evaluation, use an application programming interface (API) to cause the NL mapping system 188 to process an NL input using an NL mapping electronic object 184.

In some embodiments, a user can cause the NL mapping electronic object 184 to be stored in the network accessible storage 180 and made network accessible. For example, in some embodiments, the system 100 utilizes network accessible storage deployment techniques such as described in U.S. patent application Ser. No. 14/549,541, entitled "Methods and Systems for Cloud Computing," filed on Nov. 20, 2014, which is hereby incorporated by reference in its entirety. For instance, the CloudDeploy function described in U.S. patent application Ser. No. 14/549,541, can be utilized to deploy the NL mapping electronic object 184 to network accessible storage 180, and to obtain an identifier for utilizing the NL mapping electronic object 184 stored in the network accessible storage 180, in some embodiments. In other embodiments, other suitable network accessible storage deployment techniques may be utilized to store the NL mapping electronic object 184 in the storage 180 and making the NL mapping electronic object 184 network accessible.

As discussed in more detail below, the GrammarApply function provides arguments and/or parameters for a user to specify i) an NL mapping electronic object 184, and ii) an NL input that is to be parsed using the NL mapping electronic object 184. Responsive to receiving i) information indicating the NL mapping electronic object 184, ii) and an indication of the NL input that is to be parsed, the NL mapping module 144 and/or the NL mapping system 188 parses the NL input using the NL mapping electronic object 184. In some embodiments, the NL mapping module 144 and/or the NL mapping system 188 may also map the NL input to a machine action to be taken using the NL mapping electronic object 184.

In an illustrative embodiment, the GrammarApply function has a format as follows:

GrammarApply[grammar, input]; and/or

GrammarApply[grammar, {input$_1$, input$_2$, . . . }].

GrammarApply attempts to process an NL input indicated by the argument input (or an NL input corresponding to a concatenation of multiple NL inputs indicated by {input$_1$, input$_2$, . . . }) using an NL mapping electronic object 184 indicated by the argument grammar. Processing the input may include parsing the NL input using the NL mapping electronic object 184, in some embodiments.

Figure 2:
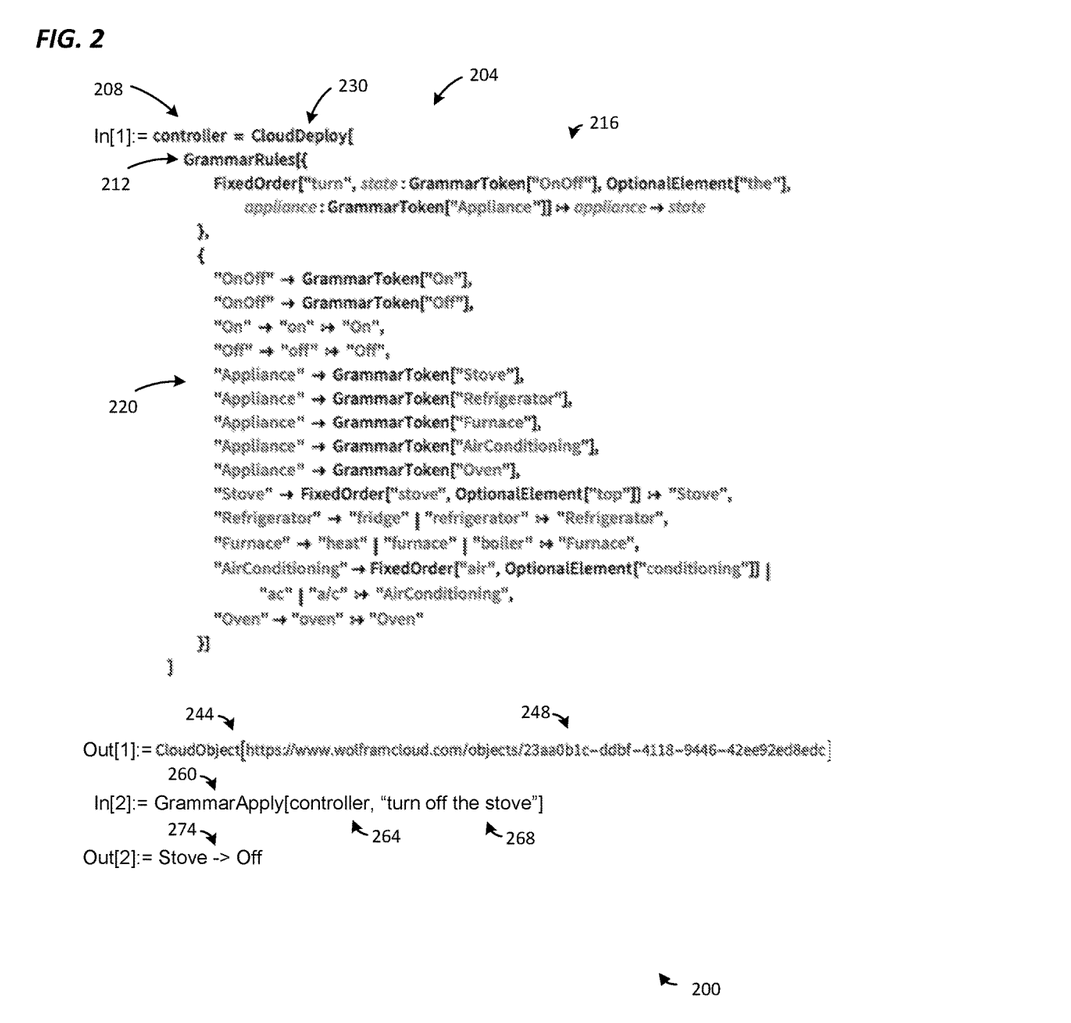
FIG. 2 is an example of programmer input utilized to create an electronic object configured to map natural language input to actions to be performed by a machine, according to an embodiment.

FIG. 2 is an example of notebook 200 in which a programmer utilizes the GrammarRules function to create an NL mapping electronic object 184, according to an embodiment. The programmer has entered into the notebook 200 an expression 204 for defining a grammar and a mapping to generating outputs that can be used to control one or more machines. The expression 204 defines an NL mapping electronic object "controller" 208 using the GrammarRules function 212. The GrammarRules function 212 includes rules arguments 216 that include grammar specification data and mapping specification data, defs arguments 220 that include further grammar specification data.

The defs arguments 220 include programmer input that specifies several grammar tokens and which values should be assigned to the grammar tokens in response to different NL words found in NL input. For example, the programmer input 220 specifies a grammar token "OnOff", and specifies an association of the "OnOff" token with a value "On" when a processor determines that the NL word "on" appears in the NL input, and specifies an association of the "OnOff" token with a value "Off" when a processors determines that the NL word "off" appears in the NL input. As another example, the programmer input 220 specifies a grammar token "Appliance", and specifies an association of the "Appliance" token with a value "Furnace" when a processor determines that any of the NL words "heat", "furnace", or "boiler" appear in NL input. Similarly, the programmer input 220 specifies an association of the grammar token "Appliance" with values "Stove", "Refrigerator", "AirConditioning", or "Oven", depending on when a processor determines that other suitable strings appear in NL input.

The rules arguments 216 include programmer input that specifies a template with which NL input is to be processed, e.g., a pattern of grammar elements. For example, the programmer input 216 specifies that the string elements must occur in the order:

turn OnOff the Appliance where OnOff and Appliance are tokens defined in the programmer input 220, and where the string element "the" is optional, e.g., a match also might occur for:

turn OnOff Appliance.

The template defined by the rules arguments 216 can be used for mapping NL input to parameters associated with machine actions. For example, the programmer input 216 specifies a template having a structure:

turn OnOff the Appliance, or
turn OnOff Appliance where the programmer input 216 specifies that a parameter state is set to the value of the grammar token OnOff and a parameter appliance is set to the value of the grammar token Appliance, and where the parameters state and appliance can be associated with machine actions.

In some embodiments, programmer input corresponding to an NL mapping electronic object 184 may specify an output(s), and/or result(s), and/or one or more parameters to be returned upon a match of NL input. In the example of FIG. 2, for instance, the programmer input 216 specifies that the NL mapping electronic object 208 is to return an association of the parameters appliance and state, e.g., appliance→state. In some embodiments, the specification of such outputs/returns may correspond to indicating machine actions to be taken. For instance, when the NL mapping electronic object 208 returns the association Furnace→On, this may be prompt a control device to generate control signal(s) that cause the machine action to be taken, such as generating control signal(s) that cause a furnace in a building to be turned on. In some embodiments, the return of such parameters may prompt a control device to generate control signal(s) that cause the machine action to be taken, such as generating control signal(s) that cause a furnace in a building to be turned on or off.

In the example of FIG. 2, the CloudDeploy function 230 is utilized to deploy the NL mapping electronic object 208 to network accessible storage 180 so that the NL mapping electronic object 208 can be accessed via the network 150, for example.

In an embodiment, in response to a user entering the programming input 204 into the notebook 200 and causing the computational application 140 to evaluate the programmer input 204 (e.g., by pressing "Enter" or taking some other suitable action), the computational application 140 (e.g., the NL mapping module 144) creates an NL mapping electronic object 184. In the example of FIG. 2, the programmer input 204 also instructs deployment of the NL mapping electronic object 184 to network accessible storage 180 (e.g., by way of the CloudDeploy function). In another embodiment, the computational application 140 interacts with the NL mapping development system 190, causing the NL mapping development system 190 to create the NL mapping electronic object 184.

In response to the evaluation, the computational application 140 generates an output 244 in the notebook 200, the output 244 including an ID of the deployed NL mapping electronic object 184 in the network accessible storage 180 to facilitate invoking the NL mapping electronic object 184.

In the example of FIG. 2, the user has entered programmer input 260 corresponding to applying the NL mapping electronic object 184 to a particular NL input. In particular, the programmer input 260 includes the GrammarApply function with a first argument 264 indicating the NL mapping electronic object 184 (e.g., "controller", which was defined by the programmer input 204), and a second argument 268 specifying the particular NL input (e.g., "turn off the stove").

In an embodiment, in response to a user entering the programming input 260 into the notebook 200 and causing the computational application 140 to evaluate the programmer input 260 (e.g., by pressing "Enter" or taking some other suitable action), the computational application 140 (e.g., the NL mapping module 144) processes the NL input 268 using the NL mapping electronic object 264. In another embodiment, the computational application 140 interacts with the NL mapping system 188, causing the NL mapping system 188 to process the NL input 268 using the NL mapping electronic object 264.

The evaluation includes processing the NL input with the defined template, which includes i) determining that the string "turn off the stove" matches a defined pattern, ii) determining that grammar tokens OnOff and Appliance have values of Off and Stove, respectively, and iii) setting parameters appliance and state to the values of the grammar tokens Appliance and OnOff, respectively. In response to the evaluation, the computational application 140 (e.g., the NL mapping module 144) generates an output 274 in the notebook 200.

Figure 3:
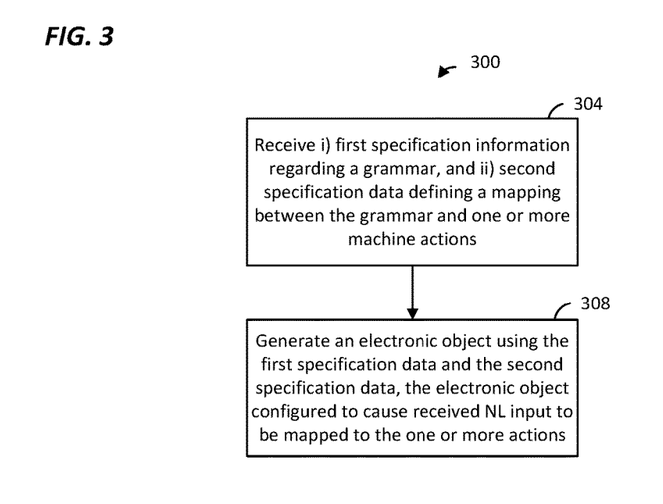
FIG. 3 is a flow diagram of an example method for generating an electronic object that maps natural language input to actions to be performed by a machine, according to an embodiment.

FIG. 3 is an example method 300 for generating an electronic object that is configured to cause one or more processors to map NL input to one or more machine actions, according an embodiment. In some embodiments, the method 300 is implemented by one or more processors executing machine readable instructions. For example, in some embodiments, the method 300 is implemented by a computer such as the computer 102. As another example, the method 300 is implemented by a computer such as the server 152, in some embodiments. As yet another example, the method 300 is implemented by multiple computers communicatively coupled via a network, such as the computer 102 and the server 152, in some embodiments.

In an embodiment, the method 300 is implemented in a system such as the system 100 of FIG. 1, and the method 300 is described with reference to FIG. 1 merely for explanatory purposes. In other embodiments, however, the method 300 is implemented in another suitable system different than the system 100 of FIG. 1.

At block 304, first specification data is received, the first specification data regarding a grammar corresponding to NL associated with one or more actions to be taken by a machine. In some embodiments, the first specification data defines the grammar. Also at block 304, second specification data is received, the second specification data regarding a mapping between the grammar and the one or more outputs to be generated. In some embodiments, the second specification data defines the mapping. In some embodiments, the first specification data and/or the second specification data defines a template for processing NL input.

In some embodiments, block 304 includes receiving the first specification data and the second specification data in programmer input entered into an electronic document, an electronic notebook, an electronic file, etc. For example, in some embodiments, the NL mapping module 144 on the computer 102 receives the first specification data and the second specification data via programmer input entered into an electronic document, an electronic notebook, an electronic file, etc. As another example, in some embodiments, the NL mapping development system 190 on the server 152 receives the first specification data and the second specification data via programmer input entered into an electronic document, an electronic notebook, an electronic file, etc.

In some embodiments, block 304 includes receiving the first specification data and the second specification data via a network. For example, in some embodiments, a user enters the first specification data and the second specification data via one or more input devices of a computer (e.g., the computer 102), and the computer then transmits the first specification data and the second specification data to a server (e.g., the server 152) via a network (e.g., the network 150). Thus, in some embodiments, the server (e.g., the server 152) receives the first specification data and the second specification data via the network (e.g., the network 150).

At block 308, an electronic object is generated using the first specification data and the second specification data, wherein the electronic object is generated so that the electronic object is configured to cause one or more processors to map received NL input to the one or more actions. In some embodiments, block 308 is implemented on a same device used to implemented block 304. For example, in some embodiments, the NL mapping module 144 on the computer 102 generates the electronic object. As another example, in some embodiments, the NL mapping development system 190 on the server 152 generates the electronic object.

In other embodiments, however block 308 is implemented on a device different than a device used to implement block 304. For example, in some embodiments, the computer 102 implements both block 304 and block 308. As another example, in some embodiments, the computer 102 receives the first specification data and the second specification data at block 304, transmits the first specification data and the second specification data to the server 152, and the server 152 implements block 308.

Several example use cases corresponding to the method 300 will now be described merely for illustrative purposes, according to several embodiments. Other suitable use cases will be recognized by those of ordinary skill in the art.

In a first example use case, a programmer working for a manufacturer of the device 198 uses the computer 102 to generate the NL mapping electronic object 184 according to the method 300, or another suitable method. The NL mapping electronic object 184 may then be stored in a memory of the device 198 during manufacture. Thus, when an end-user purchases the device 198, the device 198 is already configured to utilize the NL mapping electronic object 184. As an alternative, the manufactures causes the NL mapping electronic object 184 to be stored in network accessible storage 180. In one example, an end-user can then download the NL mapping electronic object 184 to the device 198 after purchase of the device 198. As another example, the manufacturer may pre-configure the device 198 with a handle to or identifier (ID) of the NL mapping electronic object 184 so that the device is preconfigured to access the NL mapping electronic object 184 in the network accessible storage 180.

In a second example use case, a programmer working for a third party uses the computer 102 to generate the NL mapping electronic object 184 according to the method 300, or another suitable method. The third party then causes the NL mapping electronic object 184 to be stored in network accessible storage 180. In one example, an end-user can then download the NL mapping electronic object 184 to the device 198 after purchase of the device 198. As another example, the user may configure the device 198, after purchase of the device, with a handle to or ID of the NL mapping electronic object 184 so that the device 198 is then configured to access the NL mapping electronic object 184 in the network accessible storage 180.

In a third example use case, an end user (e.g., acting as a programmer) utilizes the computer 102 to generate the NL mapping electronic object 184 according to the method 300, or another suitable method. In one example, the end user downloads the NL mapping electronic object 184 to a memory of the device 198. As another example, the end user causes the NL mapping electronic object 184 to be stored in network accessible storage 180. The user may configure the device 198, with a handle to or ID of the NL mapping electronic object 184 so that the device 198 is then configured to access the NL mapping electronic object 184 in the network accessible storage 180.

In a fourth example use case, an end user (e.g., acting as a programmer) utilizes the computer 102 to generate the NL mapping electronic object 184 according to the method 300, or another suitable method. In one example, the end user downloads the NL mapping electronic object 184 to a memory of another computer (e.g., a smart phone). As another example, the end user causes the NL mapping electronic object 184 to be stored in network accessible storage 180. The user may configure the other computer (e.g., a smart phone), with a handle to or ID of the NL mapping electronic object 184 so that the other computer (e.g., a smart phone) is then configured to access the NL mapping electronic object 184 in the network accessible storage 180. The user may then use the other computer (e.g., a smart phone) to control the device 198 using NL commands and the NL mapping electronic object 184.

In a fifth example use case, an end user (e.g., acting as a programmer) utilizes the computer 102 to generate the NL mapping electronic object 184 according to the method 300, or another suitable method, wherein the NL mapping electronic object 184 is for controlling the computer 102. After generation of the NL mapping electronic object 184, the NL mapping electronic object 184 is stored in the memory 108 of the computer 102 and the computer 102 is then configured to utilize the NL mapping electronic object 184 for controlling the computer 102. As another example, the end user causes the NL mapping electronic object 184 to be stored in network accessible storage 180. The user may configure the computer 102, with a handle to or ID of the NL mapping electronic object 184 so that the computer 102 is then configured to access the NL mapping electronic object 184 in the network accessible storage 180.

In the use cases described above, the computer 102 may act as a standalone system for generating NL mapping electronic objects 184, according to some embodiments. In other embodiments, the computer 102 is not a standalone system, but rather interacts with the server 152 to generate NL mapping electronic objects 184.

Figure 4:
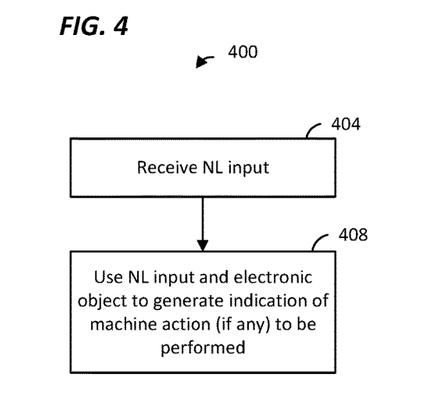
FIG. 4 is a flow diagram of an example method for using an electronic object, such as electronic objects generated according to the method of FIG. 3, to map natural language input to actions to be performed by a machine, according to an embodiment.

FIG. 4 is an example method 400 for using an electronic object that is configured to cause one or more processors to map NL input to one or more outputs that can be used to control a machine, according an embodiment. In some embodiments, the method 400 is implemented by one or more processors executing machine readable instructions. For example, in some embodiments, the method 400 is implemented by a computer such as the computer 102. As another example, the method 400 is implemented by a computer such as the server 152, in some embodiments. As yet another example, the method 400 is implemented by a computer such as the control device 198, in some embodiments. As yet another example, the method 400 is implemented by multiple computers communicatively coupled via a network, such as two or more of the computer 102, the server 152, and the control device 198, in some embodiments.

In an embodiment, the method 400 is implemented in a system such as the system 100 of FIG. 1, and the method 400 is described with reference to FIG. 1 merely for explanatory purposes. In other embodiments, however, the method 400 is implemented in another suitable system different than the system 100 of FIG. 1.

At block 404, NL input is received. In some embodiments, block 404 includes receiving the NL input via a user input device such as a keyboard, a keypad, a microphone, etc. For example, in some embodiments, the NL mapping module 144 on the computer 102 receives the first specification data and the second specification data via programmer input entered into an electronic document, an electronic notebook, an electronic file, etc. In some embodiments, block 404 includes receiving the NL input via a network. For example, in some embodiments, NL input is received via one or more input devices of a computer (e.g., the computer 102), and the computer then transmits the NL input to a server (e.g., the server 152) via a network (e.g., the network 150). Thus, in some embodiments, the server (e.g., the server 152) receives the NL input via the network (e.g., the network 150).

At block 408, the NL input received at block 404 and an electronic object, which is configured to cause one or more processors to map received NL input to the one or more outputs, are utilized to generate one or more outputs (if any) that can be used to control a machine. For example, the electronic object may be invoked and the NL input may be passed to the electronic object, in an embodiment. The NL input may be passed to the electronic object via an API, in some embodiments. Responsive to the NL input, the electronic object then generates one or more outputs (if any) that indicates an action (if any) to be performed by the machine, in an embodiment. In some embodiments, the electronic object may determine, in response to some NL inputs, that no action is to be performed by the machine, and may generate an output that indicates that no action is to be performed.

In some embodiments, the NL mapping module 144 on the computer 102 implements block 408. As another example, in some embodiments, the NL mapping system 188 on the server 152 implements block 408. As yet another example, in some embodiments, the NL control module 199 on the control device 198 implements block 408.

In some embodiments, the output(s) generated by the electronic object may be utilized to cause a machine to perform an action indicated by the output(s). For example, the control device 198 may be configured to generate one or more control signals, responsive to the output, that cause a machine to take an action indicated by the output. In an embodiment, software executing on the processor of the control device 198 may generate one or more control signals, responsive to the output, that cause a machine to take an action indicated by the output. In an embodiment, the control device 198 may include control logic, implemented on one or more integrated circuit devices, configured to generate one or more control signals, responsive to the output, that cause a machine to take an action indicated by the output.

Figure 5:
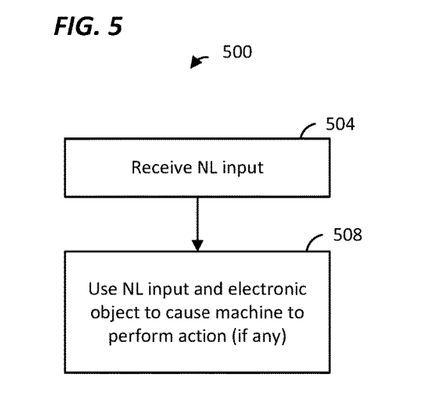
FIG. 5 is a flow diagram of another example method for using an electronic object, such as electronic objects generated according to the method of FIG. 3, to map natural language input to actions to be performed by a machine, according to another embodiment.

FIG. 5 is another example method 500 for using an electronic object that is configured to cause one or more processors to map NL input to one or more machine actions, according another embodiment. In some embodiments, the method 500 is implemented by one or more processors executing machine readable instructions. For example, in some embodiments, the method 500 is implemented by a computer such as the computer 102. As another example, the method 500 is implemented by a computer such as the server 152, in some embodiments. As yet another example, the method 500 is implemented by a computer such as the control device 198, in some embodiments. As yet another example, the method 500 is implemented by multiple computers communicatively coupled via a network, such as two or more of the computer 102, the server 152, and the control device 198, in some embodiments.

In an embodiment, the method 500 is implemented in a system such as the system 100 of FIG. 1, and the method 500 is described with reference to FIG. 1 merely for explanatory purposes. In other embodiments, however, the method 500 is implemented in another suitable system different than the system 100 of FIG. 1.

At block 504, NL input is received. Block 504 is similar to block 404 of FIG. 4 and is not described further for purposes of brevity.

At block 508, the NL input received at block 504 and an electronic object, which is configured to cause one or more processors to map received NL input to the one or more actions to be taken by a machine, are utilized to cause the machine to take an action. For example, the electronic object may be invoked and the NL input may be passed to the electronic object, in an embodiment. The NL input may be passed to the electronic object via an API, in some embodiments. Responsive to the NL input, the electronic object then causes the machine to perform an action, in an embodiment. In some embodiments, the electronic object may determine, in response to some NL inputs, that no action is to be performed by the machine, and in response no action is performed.

In some embodiments, the NL mapping module 144 on the computer 102 implements block 508. In such embodiments, block 508 results in the computer 102 performing an action. As another example, in some embodiments, the NL mapping system 188 on the server 152 implements block 508. In such embodiments, block 508 results in the server 152 performing an action. As yet another example, in some embodiments, the NL control module 199 on the control device 198 implements block 508. In such embodiments, block 508 results in the control device 198 performing an action.

In various embodiments, performing the action may comprise one or more of i) a processor performing one or more particular actions (e.g., computations, assignment of values to variables, execution of a particular program, execution of a particular software module, starting a program, ending a program, controlling an executing program, performing a file operation, performing a memory operation, etc.), ii) controlling a peripheral device (e.g., a light, a display, a speaker, a storage device, a NIC, etc.), iii) communicating information, etc.

Several example use cases corresponding to the method 400 and/or the method 500 will now be described merely for illustrative purposes, according to several embodiments. Other suitable use cases will be recognized by those of ordinary skill in the art.

In a first example use case, a user speaks a command, which is received by a microphone of the device 198. The device 198 sends audio data to the server 152, or another server, which uses speech recognition technology to convert the audio data to NL text data. The device 198 may also send a handle to or ID of an NL mapping electronic object 184 to the server 152. The server 152 may then use the NL mapping electronic object 184, stored in the network accessible storage 180, to process the NL text data to generate an output(s). The server 152 may then transmit the output(s) to the device 198, which uses the output(s) to cause one or more machine actions to be performed.

In a second example use case, a user speaks a command, which is received by a microphone of the device 198. The device 198 sends audio data to the server 152, or another server, which uses speech recognition technology to convert the audio data to NL text data. The server 152 may then transmit the NL text data back to the device 198. The device 198 may then use the NL mapping electronic object 184, stored in a memory of the device 198, to process the NL text data to generate an output(s). The device 198 then uses the output(s) to cause one or more machine actions to be performed.

In a third example use case, a user speaks a command, which is received by a microphone of the computer 102. The computer 102 sends audio data to the server 152, or another server, which uses speech recognition technology to convert the audio data to NL text data. The computer 102 may also send a handle to or ID of an NL mapping electronic object 184 to the server 152. The server 152 may then use the NL mapping electronic object 184, stored in the network accessible storage 180, to process the NL text data to generate an output(s). The server 152 may then transmit the output(s) to the device 198, which uses the output(s) to cause one or more machine actions to be performed.

In a fourth example use case, a user speaks a command, which is received by a microphone of the computer 102. The computer 102 sends audio data to the server 152, or another server, which uses speech recognition technology to convert the audio data to NL text data. The server 152 may then transmit the NL text data back to the device 198. The device 198 may then use the NL mapping electronic object 184, stored in a memory of the device 198, to process the NL text data to generate an output(s). The device 198 then uses the output(s) to cause one or more machine actions to be performed.

In a fifth example use case, a user speaks a command, which is received by a microphone of the computer 102. The computer 102 sends audio data to the server 152, or another server, which uses speech recognition technology to convert the audio data to NL text data. The server 152 then sends the NL text data back to the computer 102. The computer 102 may then use the NL mapping electronic object 184, stored in a memory of the computer 102, to process the NL text data to generate an output(s). The computer 102 then uses the output(s) to cause one or more machine actions to be performed by the computer 102.

Recursive Grammar

Figure 6:
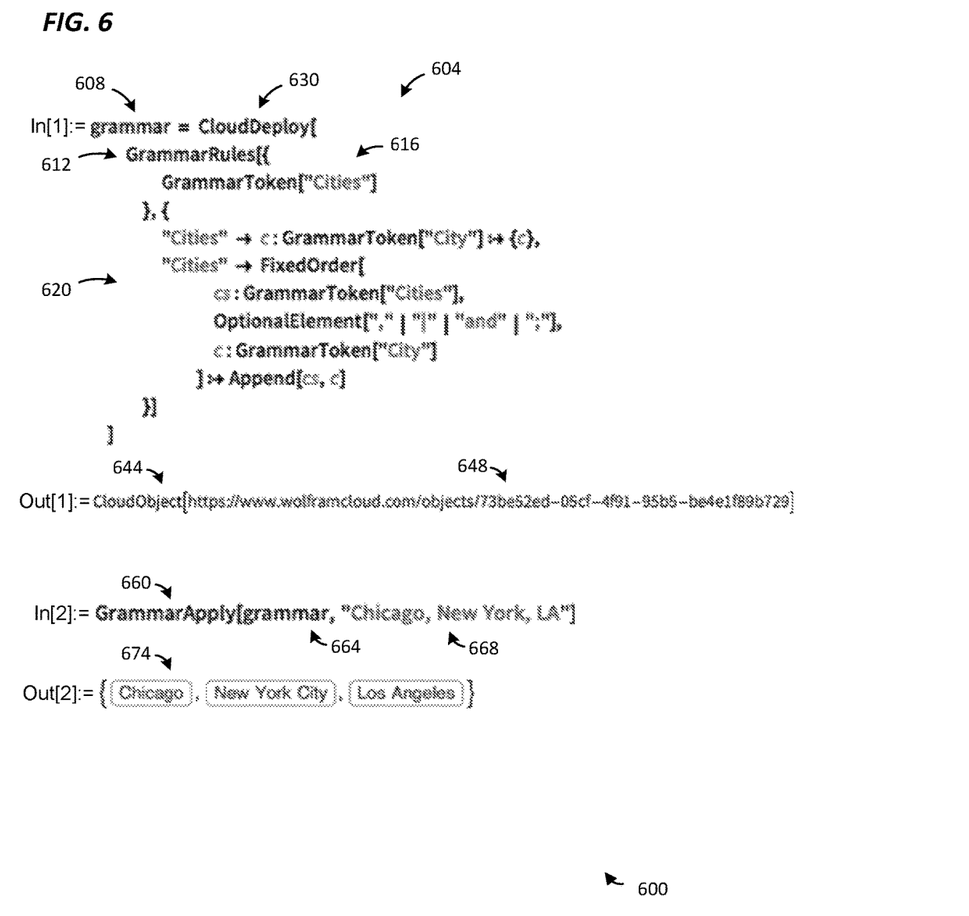
FIG. 6 is an example of programmer input utilized to create an electronic object configured to map natural language input to actions to be performed by a machine, where the electronic object is also configured to use recursive grammar rules, according to an embodiment.

In some embodiments, a programming language and/or computational application provides built-in functions that enable the design of recursive grammar rules. FIG. 6 is an example of notebook 600 in which a programmer utilizes the GrammarRules function to design recursive grammar rules, according to an embodiment. The programmer has entered into the notebook 600 an expression 604 for defining recursive grammar rules and a mapping to machine actions. The expression 604 defines an NL mapping electronic object "grammar" 608 using the GrammarRules function 612. The GrammarRules function 612 includes rules arguments 616 that include grammar specification data, and defs arguments 620 that include grammar specification data and mapping specification data.

The rules arguments 616 specify a grammar token Cities, and the defs arguments 620 include programmer input that further specifies the grammar token Cities. For example, the programmer input 620 specifies that Cities should be assigned a single grammar token City, where City is a built in grammar token of the programming language. For instance, in some embodiments, the computational application 140, the NL mapping system 188, the NL control module 199, etc., is configured to, in response to programmer input GrammarToken["City"], recognize in a text input words that correspond to known city entities (e.g., known to the computational application 140, known to the NL mapping system 188, known to an interpreter, known to the answering system 194, etc.). In some embodiments, the computational application 140, the NL mapping system 188, the NL control module 199, etc., interfaces with the answering system 194 (e.g., sends input text to the answering system 194, which responds with a known entity or entities that corresponds with the text) to facilitate recognition in a text input words that correspond to known city entities.

Additionally, the programmer input 620 specifies that grammar token Cities could also be assigned a previously recognized GrammarToken Cities, with a single grammar token City that follows the previously recognized GrammarToken Cities.

The defs arguments 620 also include programmer input that specifies a template for mapping NL input to parameters associated with machine actions. For example, the programmer input 620 specifies a template having a structure:

Cities City where the programmer input 620 specifies that a list parameter cs is set to the value of the grammar token Cities and a list parameter c is set to the value of the grammar token City. The programmer input 620 also specifies a machine action to be taken when NL input matches the template: append the list parameter c to the list parameter cs.

In the example of FIG. 6, the CloudDeploy function 630 is utilized to deploy the NL mapping electronic object 608 to network accessible storage 180 so that the NL mapping electronic object 608 can be accessed via the network 150, for example.

In an embodiment, in response to a user entering the programming input 604 into the notebook 600 and causing the computational application 140 to evaluate the programmer input 604 (e.g., by pressing "Enter" or taking some other suitable action), the computational application 140 (e.g., the NL mapping module 144) creates an NL mapping electronic object 184. In the example of FIG. 6, the programmer input 604 also instructs deployment of the NL mapping electronic object 184 to network accessible storage 180 (e.g., by way of the CloudDeploy function). In another embodiment, the computational application 140 interacts with the NL mapping development system 190, causing the NL mapping development system 190 to create the NL mapping electronic object 184.

In response to the evaluation, the computational application 140 generates an output 644 in the notebook 600, the output 644 including an ID 648 of the deployed NL mapping electronic object 184 in the network accessible storage 180 to facilitate invoking the NL mapping electronic object 184.

In the example of FIG. 6, the user has entered programmer input 660 corresponding to applying the NL mapping electronic object 184 to a particular NL input. In particular, the programmer input 660 includes the GrammarApply function with a first argument 664 indicating the NL mapping electronic object 184 (e.g., "grammar", which was defined by the programmer input 604), and a second argument 668 specifying the particular NL input (e.g., "Chicago, New York, LA").

In an embodiment, in response to a user entering the programming input 660 into the notebook 600 and causing the computational application 140 to evaluate the programmer input 660 (e.g., by pressing "Enter" or taking some other suitable action), the computational application 140 (e.g., the NL mapping module 144) processes the NL input 668 using the NL mapping electronic object 664. In another embodiment, the computational application 140 interacts with the NL mapping system 188, causing the NL mapping system 188 to process the NL input 668 using the NL mapping electronic object 664.

The evaluation includes i) recursively determining that the string "Chicago, New York, LA" matches a defined pattern, ii) recursively determining values of grammar tokens City and Cities, and iii) recursively setting parameters c and cs to the values of the grammar tokens City and Cities, respectively. In response to the evaluation, the computational application 140 (e.g., the NL mapping module 144) generates an output 674 in the notebook 600. As can be seen in the output 674, the text "New York" was recognized as the known city entity "New York City", and the text "LA" was recognized as the known city entity "Los Angeles".

Figure 7:
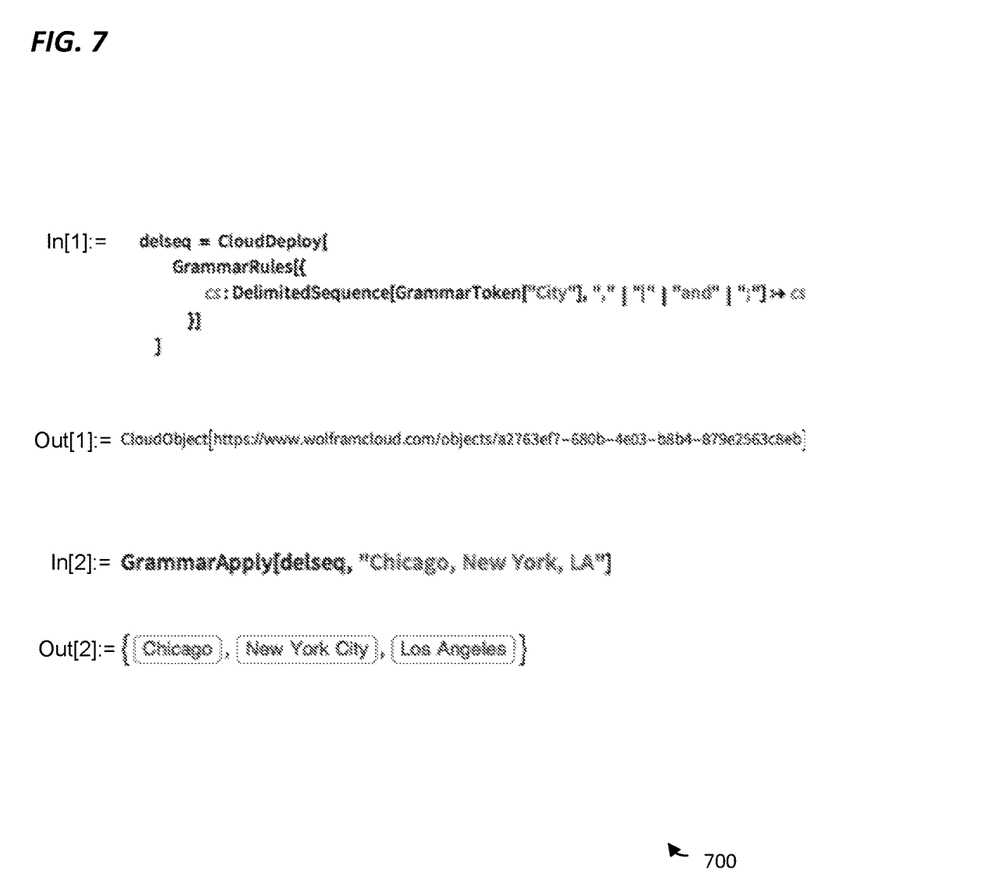
FIG. 7 is another example of programmer input utilized to create an electronic object configured to map natural language input to actions to be performed by a machine, where the electronic object is also configured to use recursive grammar rules, according to another embodiment.

FIG. 7 is another example of notebook 700 in which a programmer utilizes the GrammarRules function to design recursive grammar rules, according to an embodiment. The example in FIG. 7 provides functionality similar to that provided by the example of FIG. 6. For example, the example in FIG. 7 is an alternative approach for specifying the grammar rules specified in example of FIG. 6, where the programmer input is more concise as compared to the programmer input illustrated in FIG. 6. More specifically, in the example of FIG. 7, the built-in function "DelimitedSequence" is utilized to specify a recursive grammar rule.

As discussed above, in some embodiments, a programming language and/or computational application provides built-in grammar tokens that correspond to known entities (e.g., known to the computational application 140, an interpreter, the answering system 194, etc.). For instance, as an illustrative example, City is a built in grammar token that corresponds to city entities. Thus, for example, when a term such as "LA" occurs in an NL statement, and an electronic NL mapping electronic object 184 is configured to utilize GrammarToken["City"], the NL mapping electronic object 184 may interpret the term "LA" as corresponding to the city entity "Los Angeles". For instance, in some embodiments, the computational application 140, an interpreter, the NL mapping system 188, the answering system 194, etc., is configured to recognize that the term "LA" is commonly used in NL to refer to the city entity "Los Angeles".

In other embodiments, a programming language and/or computational application provides built-in grammar tokens that correspond to any suitable combination of one or more known entities such as City (e.g., text "NYC" corresponds to city entity New York City), Number (e.g., text "4.5e7" corresponds to number entity $4.5 \times 10^7$), SemanticNumber (e.g., statement "seventy-five" corresponds to number entity 75), Date (e.g., text "6/23/08" corresponds to date entity Jun. 23, 2008), Time (e.g., text "5 PM" corresponds to time entity 5:00 PM), Temperature (e.g., text "68" corresponds to temperature entity 68° F.), etc. As discussed above, in some embodiments, the computational application 140, the NL mapping system 188, an interpreter, etc., is configured to, in response to programmer input corresponding to a built-in grammar token, recognize in a text input words, numbers, etc., that correspond to known entities (e.g., known to the computational application 140, known to the NL mapping system 188, known to an interpreter, known to the answering system 194, etc.). In some embodiments, the computational application 140, the NL mapping system 188, the NL control module 199, etc., interfaces with the answering system 194 (e.g., sends input text to the answering system 194, which responds with a known entity or entities that corresponds with the text) to facilitate recognition in a text input words that correspond to known entities.

Referring again to FIG. 1, a system such as the system 100 provides tools for programmers to design and generate NL mapping electronic objects 184 for controlling machines using NL. As an illustrative example, a user could use the computer 102 to design and generate NL mapping electronic objects 184 for controlling the computer 102 (or another computer) using NL. For instance, NL mapping electronic objects 184 could be generated for using NL statements to control actions of the computer 102 (or another computer) such as causing a word processing application to create a new word processing document based on a chosen template, causing an email application to perform a desired search of emails in a particular folder, causing the email application to create a new email addressed to a particular person with a particular subject, causing an operating system to perform a desired file operation (e.g., copying a file to a particular folder, moving a file to a particular folder, deleting a file, etc.), etc. In some embodiments and/or scenarios, the created NL mapping objects 184 could be stored on the computer that is to be controlled, for example. In some embodiments and/or scenarios, the created NL mapping objects 184 could be stored in the network accessible storage 180, and the computer that is to be controlled could utilize the NL mapping objects 184 from the network accessible storage 180, for example.

As another illustrative example, a user could use the computer 102 to design and generate NL mapping electronic objects 184 for controlling the control device 198 using NL, such as controlling a thermostat, controlling lights (e.g., a home automation system), controlling a consumer appliance, etc. In some embodiments and/or scenarios, the created NL mapping objects 184 could be electronically transferred to and stored on the control device 198, for example. In some embodiments and/or scenarios, the created NL mapping objects 184 could be stored in the network accessible storage 180, and the control device 198 could utilize the NL mapping objects 184 from the network accessible storage 180, for example. In some embodiments, the control device 198 may be a computer (e.g., a smart phone) that is configured to use NL mapping objects 184 to generate control signals for controlling some other device, e.g., a thermostat, a home automation system, a consumer appliance, etc.

As yet another illustrative example, a manufacturer of a manufactured device (e.g., a consumer appliance, a thermostat, a consumer electronic device, a home automation system, etc.) (or a third party) could use the computer 102 to design and generate NL mapping electronic objects 184 for controlling the manufactured device using NL. In some embodiments and/or scenarios, the created NL mapping objects 184 could be electronically transferred to and stored on the manufactured device, for example. In some embodiments and/or scenarios, the created NL mapping objects 184 could be stored in the network accessible storage 180, and the manufactured device could utilize the NL mapping objects 184 from the network accessible storage 180, for example. In some embodiments and/or scenarios, the created NL mapping objects 184 could be electronically transferred to and stored on a control device (e.g., the control device 198) that is separate from (but capable of electronically communicating with) the manufactured device, for example. In some embodiments and/or scenarios, the created NL mapping objects 184 could be stored in the network accessible storage 180, and the separate control device could utilize the NL mapping objects 184 in the network accessible storage 180 to control the manufactured device, for example.

A system such as the system 100 also may facilitate using NL mapping electronic objects 184 to control machines using NL. As an illustrative example, the NL control module 199 running in a computer or the control device 198 may use NL mapping electronic objects 184 stored on the computer or the control device 198 for controlling the computer, the control device 198, and/or a separate manufactured device using NL. As another illustrative example, the NL control module 199 running in a computer or the control device 198 may use NL mapping electronic objects 184 stored in the network accessible storage 180 for controlling the computer, the control device 198, and/or a separate manufactured device using NL. As yet another illustrative example, a computer or the control device 198 may send NL input to the server 152, and the server 152 (e.g., the NL mapping system 188) may use NL mapping electronic objects 184 stored in the network accessible storage 180 for generating control information; the server 152 may send the control information to the computer or the control device 198, which may use the control information for to control the computer, the control device 198, and/or a separate manufactured device.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, a programmable logic device, etc. When implemented utilizing a processor executing software or firmware instructions, the software or firmware instructions may be stored in any tangible, non-transitory computer readable medium or media such as a magnetic disk, an optical disk, a tape drive, a RAM, a ROM, a flash memory, a memory of a processor, etc. Likewise, the software or firmware instructions may be delivered to a user or a system via any known or desired delivery method including, for example, on a tangible, non-transitory computer readable medium or media, or via communication media. The software or firmware instructions may include machine readable instructions that, when executed by the processor, cause the processor to perform various acts.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for mapping natural language input to processor-generated outputs, the method comprising:
receiving, at one or more computers, programmer input in a programming language, the programmer input including (i) a built-in function of the programming language corresponding to generation of electronic objects that map natural language input to one or more electronic outputs, (ii) first specification data defining a grammar corresponding to natural language that is associated with controlling an electronically controllable machine, and (iii) second specification data defining a mapping between the grammar and one or more electronic outputs to be generated, the one or more electronic outputs for controlling the electronically controllable machine, wherein the programming language includes (i) the built-in function corresponding to generation of electronic objects that map natural language input to one or more electronic outputs and (ii) at least one other built-in function unrelated to natural language processing, the at least one other built-in function including one or more of (a) a built-in function corresponding to generating displays, (b) a built-in function corresponding to deploying electronic objects to a network accessible memory, and (c) a built-in function corresponding to generation of electronic forms; and generating, at one or more computers, an electronic object using the first specification data and the second specification data, the electronic object configured to, when executed by one or more processors, cause the one or more processors to map received natural language input to the one or more electronic outputs to facilitate controlling the electronically controllable machine with natural language statements.

2. The method of claim 1, wherein the first specification data specifies grammar rules corresponding to a context-free grammar.

3. The method of claim 1, wherein the first specification data indicates a template for processing natural language statements.

4. The method of claim 1, wherein the first specification data and the second specification data are arguments of the built-in function of the programming language corresponding to generation of electronic objects that map natural language input to one or more electronic outputs.

5. The method of claim 1, further comprising:
storing, with one or more computers, the electronic object in a network-accessible storage system; and
associating, with one or more computers, the electronic object stored in the network-accessible storage system with an identifier to facilitate network access to the electronic object stored in the network-accessible storage system using the identifier.

6. The method of claim 1, wherein the first specification data and the second specification data are received via a communication network.

7. The method of claim 1, wherein:
the one or more electronic outputs correspond to one or more actions to be performed by an electronically controllable machine such that the one or more actions can be used to control the machine.

8. A system, comprising:
one or more processors; and
one or more memory devices coupled to the one or more processors, the one or more memory devices storing machine readable instructions that, when executed by the one or more processors, cause the one or more processors to:
receive programmer input in a programming language, the programmer input including (i) a built-in function of the programming language, the built-in function corresponding to generation of electronic objects that map natural language input to one or more electronic outputs, (ii) first specification data defining a grammar corresponding to natural language associated with one or more electronic outputs to be generated, the one or more electronic outputs for controlling an electronically controllable machine, and (iii) second specification data defining a mapping between the grammar and the one or more electronic outputs to be generated, wherein the programming language includes (i) the built-in function corresponding to generation of electronic objects that map natural language input to one or more electronic outputs and (ii) at least one other built-in function unrelated to natural language processing, the at least one other built-in function including one or more of (a) a built-in function corresponding to generating displays, (b) a built-in function corresponding to deploying electronic objects to a network accessible memory, and (c) a built-in function corresponding to generation of electronic forms, and
generate an electronic object using the first specification data and the second specification data, the electronic object configured to, when executed by the one or more processors or one or more other processors, cause the one or more processors, or the one or more other processors, to map received natural language input to the one or more electronic outputs to facilitate controlling the electronically controllable machine with natural language statements.

9. The system of claim 8, wherein the first specification data specifies grammar rules corresponding to a context-free grammar.

10. The system of claim 8, wherein the first specification data indicates a template for processing natural language statements.

11. The system of claim 8, wherein the first specification data and the second specification data are arguments of the built-in function of the programming language corresponding to generation of electronic objects that map natural language input to one or more electronic outputs.

12. The system of claim 8, further comprising:
a network accessible storage system;
wherein the one or more memory devices storing machine readable instructions that, when executed by the one or more processors, cause the one or more processors to:
store the electronic object in the network-accessible storage system, and
associate the electronic object stored in the network-accessible storage system with an identifier to facilitate network access to the electronic object stored in the network-accessible storage system using the identifier.

13. The system of claim 8, further comprising:
network interface hardware configured to communicatively couple the system with a communication network;
wherein the first specification data and the second specification data are received via a communication network.

14. The system of claim 8, wherein:
the one or more electronic outputs correspond to one or more actions to be performed by an electronically controllable machine such that the one or more actions can be used to control the machine.

15. A method, comprising:
receiving, at one or more processors, natural language (NL) input; and
using, at the one or more processors, i) the NL input, ii) a built-in function of a programming language, the built-in function corresponding to use of electronic objects that map natural language input to one or more electronic outputs, and iii) an electronic object to generate one or more electronic outputs for controlling an electronically controllable machine, wherein the electronic object
defines a grammar corresponding to NL associated with one or more electronic outputs for controlling an electronically controllable machine,
defines a mapping between the grammar and the one or more electronic outputs, and
is configured to, when executed by the one or more processors, cause the one or more processors to map received NL input to the one or more electronic outputs to facilitate controlling the electronically controllable machine with the received NL input, and wherein the programming language includes (i) the built-in function corresponding to use of electronic objects that map natural language input to one or more electronic outputs and (ii) at least one other built-in function unrelated to natural language processing, the at least one other built-in function including one or more of (a) a built-in function corresponding to generating displays, (b) a built-in function corresponding to deploying electronic objects to a network accessible memory, and (c) a built-in function corresponding to generation of electronic forms.

16. The method of claim 15, wherein the electronic object defines a context free grammar.

17. The method of claim 15, wherein the electronic object defines a template for processing NL statements.

18. The method of claim 15, wherein receiving the NL input comprises receiving the NL input via a communication network.

19. The method of claim 18, further comprising:
receiving, at the one or more processors, an identifier of the object via the communication network in conjunction with receiving the NL input;
wherein using i) the NL input, ii) the built-in function of the programming language corresponding to use of electronic objects that map natural language input to one or more electronic outputs, and iii) the electronic object to generate the one or more electronic outputs includes using the identifier to access the electronic object in network-accessible storage.

20. The method of claim 15, further comprising:
transmitting the one or more electronic outputs via a communication network.

21. The method of claim 15, wherein:
the one or more electronic outputs correspond to one or more actions to be taken by an electronically controllable machine.

22. The method of claim 21, further comprising:
using the one or more electronic outputs to generate one or more control signals to electronically control the machine to take one or more actions corresponding to the one or more electronic outputs.

23. A system, comprising:
one or more processors; and
one or more memory devices coupled to the one or more processors, the one or more memory devices storing machine readable instructions that, when executed by the one or more processors, cause the one or more processors to:
receive natural language (NL) input, and
use i) the NL input, ii) a built-in function of a programming language, the built-in function corresponding to use of electronic objects that map natural language input to one or more electronic outputs, and iii) an electronic object to generate one or more electronic outputs for controlling an electronically controllable machine, wherein the electronic object defines a grammar corresponding to NL associated with a plurality of actions to be taken by the electronically controllable machine, defines a mapping between the grammar and the one or more electronic outputs, and
is configured to, when executed by the one or more processors, cause the one or more processors to map received NL input to the one or more electronic outputs to facilitate controlling the electronically controllable machine with natural language statements and wherein the programming language includes (i) the built-in function corresponding to use of electronic objects that map natural language input to one or more electronic outputs and (ii) at least one other built-in function unrelated to natural language processing, the at least one other built-in function including one or more of (a) a built-in function corresponding to generating displays, (b) a built-in function corresponding to deploying electronic objects to a network accessible memory, and (c) a built-in function corresponding to generation of electronic forms.

24. The system of claim 23, wherein the electronic object defines a context free grammar.

25. The system of claim 23, wherein the electronic object defines a template for mapping NL statements to one or more electronic outputs.

26. The system of claim 23, further comprising:
network interface hardware configured to communicatively couple the system with a communication network;
wherein the NL input is received via the communication network.

27. The system of claim 26, wherein the one or more memory devices further store machine readable instructions that, when executed by the one or more processors, cause the one or more processors to:
receive an identifier of the object via the communication network in conjunction with receiving the NL input; and
use the identifier to access the electronic object in network-accessible storage.

28. The system of claim 23, further comprising:
network interface hardware configured to communicatively couple the system with a communication network;
wherein the one or more memory devices further store machine readable instructions that, when executed by the one or more processors, cause the one or more processors to transmit the one or more electronic outputs via the communication network.

29. The system of claim 23, wherein:
the one or more electronic outputs correspond to one or more actions to be taken by an electronically controllable machine.

30. The system of claim 23, further comprising:
a control signal generator configured to use the one or more electronic outputs to generate one or more control signals to electronically control the machine to take one or more actions corresponding to the one or more electronic outputs.

* * * * *